United States Patent
Fukasawa

[11] Patent Number: 5,875,377
[45] Date of Patent: Feb. 23, 1999

[54] DEVICE FOR ILLUMINATING AN ORIGINAL

[75] Inventor: Motomu Fukasawa, Tokyo, Japan

[73] Assignee: Canon Kabushiki Kaisha, Tokyo, Japan

[21] Appl. No.: 638,229

[22] Filed: Apr. 26, 1996

[51] Int. Cl.⁶ .......................... G03G 15/04; G03B 27/54
[52] U.S. Cl. .............................. 399/220; 355/67; 399/221
[58] Field of Search ..................................... 399/177, 211, 399/219, 220, 221; 355/67, 68, 70, 35, 37

[56] References Cited

U.S. PATENT DOCUMENTS

| | | | |
|---|---|---|---|
| 3,498,708 | 3/1970 | Howard | 399/220 |
| 4,189,763 | 2/1980 | Suzuki et al. | 399/221 X |
| 4,239,383 | 12/1980 | Peterson | 399/221 X |
| 4,473,865 | 9/1984 | Landa | 399/221 X |
| 4,483,609 | 11/1984 | Harada | 399/221 |
| 4,721,979 | 1/1988 | Kohrogi et al. | 399/221 X |
| 4,751,553 | 6/1988 | Fukasawa | 355/45 |
| 4,794,427 | 12/1988 | Shirai et al. | 355/49 |
| 5,287,147 | 2/1994 | Fukasawa et al. | 399/211 |
| 5,768,663 | 6/1998 | Lin | 399/220 |

FOREIGN PATENT DOCUMENTS

| | | |
|---|---|---|
| 55-137767 | 10/1980 | Japan . |
| 56-78853 | 6/1981 | Japan . |
| 60-254125 | 12/1985 | Japan . |
| 62-043259 | 2/1987 | Japan . |
| 5-219311 | 8/1993 | Japan . |
| 08-184917 | 7/1996 | Japan . |

*Primary Examiner*—S. Lee
*Attorney, Agent, or Firm*—Fitzpatrick, Cella, Harper & Scinto

[57] ABSTRACT

A device for illuminating an original for use in an original reading apparatus for reading an original placed on an original supporting table has a light source having a filament having its lengthwise direction disposed so as to be perpendicular to a reading line.

6 Claims, 5 Drawing Sheets

DEVICE FOR ILLUMINATING AN ORIGINAL

BACKGROUND OF THE INVENTION

1. Field of the Invention

This invention relates to an apparauts for illuminating an original for use in an original reading apparatus for reading an original placed on an original supporting table, and more particularly to a device for illuminating an original effective for an apparatus for dividing an original into a plurality of areas and reading them.

2. Related Background Art

The device for illuminating an original of an image reading apparatus has heretofore been constructed as shown in FIG. 5 of the accompanying drawings. Referring to FIG. 5 which is a figure depicted to illustrate the difference from the present invention, the device for illuminating an original comprises a halogen lamp 3 comprising a group of filaments 1 wound in parallelism to the reading line 2 of an origin 4, and a reflecting member 5. As examples of applications similar to this, there are known many ones such as Japanese Laid-Open Patent Application No. 60-254125 and Japanese Laid-Open Patent Application No. 56-78853.

On the other hand, among image reading apparatuses, there is an apparatus of the movable optical system type which divisionally scans and reads an original, for example, a reading apparatus described in Japanese Laid-Open Patent Application No. 55-137767.

Now, in a lamp of the type in which a filament is made to emit light, the light emission distribution in the radial direction of the filament is most uniform, and in the lengthwise direction (the direction of arrow X in FIG. 5) of the filament, the light emission intensity of the winding portion thereof is greatest and the light emission intensity of the other portions is somewhat small. That is, in the lengthwise direction of the filament, the light emission distribution is not uniform.

In the prior-art apparatus wherein such a filament is disposed parallel to the reading line, the light emission intensity particularly on the lengthwisely opposite end portions of the lamp is small and therefore, the Shading phenomenon could not be avoided.

SUMMARY OF THE INVENTION

The present invention has been made in view of the above-noted problem and an object thereof is to provide a device for illuminating an original capable of uniformly illuminating a reading line.

Another object of the present invention is to provide a device for illuminating an original effectively utilizing light emitted in the radial direction of a filament.

Still another object of the present invention is to provide a device for illuminating an original in which the lengthwise direction of a filament is perpendicular to a reading line.

Further objects of the present invention will become apparent from the following detailed description taken in conjunction with the accompanying drawings.

DESCRIPTION OF THE PREFERRED EMBODIMENTS

[First Embodiment]

A first embodiment of the present invention will hereinafter be described with reference to FIGS. 1 and 2.

Figure 1:
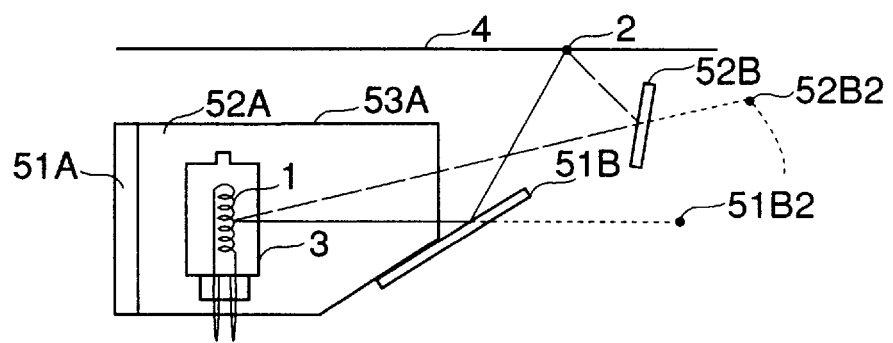
FIG. 1 is a side view of a first embodiment of the present invention.
Figure 2:
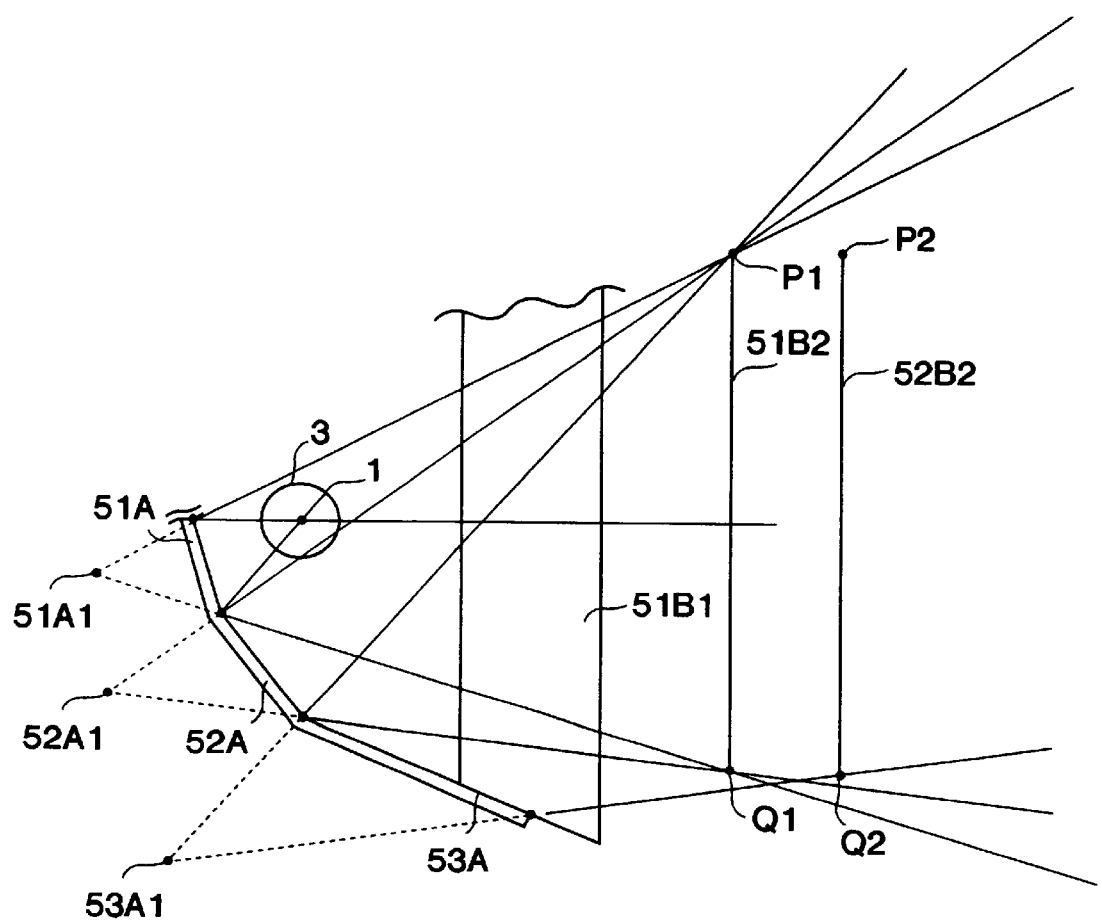
FIG. 2 is a top plan view of the first embodiment of the present invention.

In FIG. 1, a reading line 2 on an original 4 is illuminated by a light beam emitted from a halogen lamp 3 having a filament 1, with the aid of a group of reflecting surfaces A (reflecting surfaces 51A, and 52A, 53A) and a group of reflecting surfaces B (reflecting surfaces 51B, 52B). Although not shown, a photoelectric conversion element (CCD) is disposed in the lower portion of the lamp 3, and reads the original while moving in the main scanning direction and sub-scanning direction of the original with the illuminating unit.

In FIG. 1, the axial direction of the filament 1 is disposed in a direction perpendicular to the reading line 2 and around it, the group of reflecting surfaces A of non-power are comprised of plane mirrors, in this case, in the axial direction of the filament 1. Further, the aerial mirror images 51B2 and 52B2 of the reading line 2 obtained by the group of reflecting surfaces B of non-power (in this case, plane mirrors) with respect to the direction of the reading line 2 are shown in space. Part of the light beam having an intensity distribution axis-symmetrically which is emitted from the filament 1 is intactly reflected by the group of reflecting surfaces B and illuminates the reading line 2. The remainder of the light beam is also reflected by the group of reflecting surfaces A, and thereafter is reflected by the group of reflecting surfaces B and illuminates the reading line 2. FIG. 2 is a view in which FIG. 1 is seen from above. The reflecting surfaces 51A, 52A and 53A constituting the group of reflecting surfaces B are disposed symmetrically with respect to the perpendicular bisecting plane of the reading line and therefore, in FIG. 2, description will be made of the lower half. The end points P1, Q1, P2 and Q2 of the mirror images 51B2 and 52B2 of the reading line 2 formed by the group of reflecting surfaces B are all included in a triangular area formed by the virtual image 51A1 of the filament 1 formed in space by the reflecting surface 51A and two straight lines linking the opposite end portions of the reflecting surface 51A together.

Likewise, the light from the virtual image 52A1 of the filament formed by the reflecting surface 52A and the light from the virtual image 53A1 of the filament formed by the reflecting surface effect illumination, including the end points P1, Q1, P2 and Q2. Thus, without one and the same illumination area being divided by a plurality of reflecting surfaces, each one of the plurality of reflecting surfaces illuminates the whole area of the reading line, whereby it is made possible to realize a highly efficient illuminating system. Particularly the light being emitted in the radial direction of the filament 1 is effectively utilized and therefore, the illuminance distribution on the reading line 2 is very uniform.

In this case, the reflecting surfaces constituting the groups of reflecting surfaces A and B are not limited to flat surfaces but may be curved surfaces, and if cylindrical mirrors are used, higher efficiency can be realized. Further, the reflecting surfaces forming the groups of reflecting surfaces A and B need not be spatially continuous.

[Second Embodiment]

Figure 3:
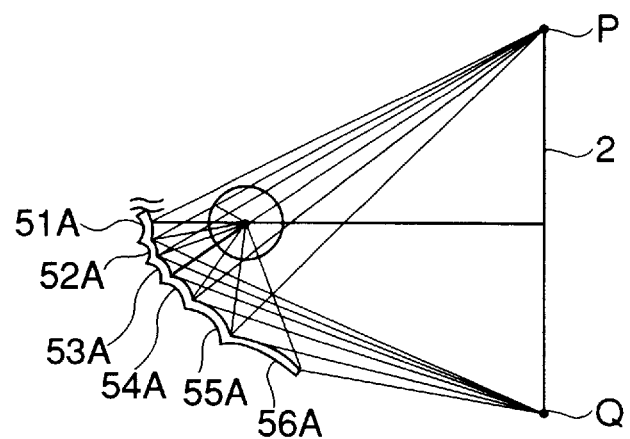
FIG. 3 is a top plan view of a second embodiment of the present invention.

A second embodiment of the present invention will now be described with reference to FIG. 3. This embodiment uses as the group of reflecting surfaces A a cylindrical convex mirror having no power in the direction of the filament. Thereby, as compared with the case where the plane mirrors are used, a greater number of reflecting surfaces 51A ... 56A can be disposed in the same space to thereby realize an illuminating device which is compact and high in illuminating efficiency.

[Third Embodiment]

Figure 4:
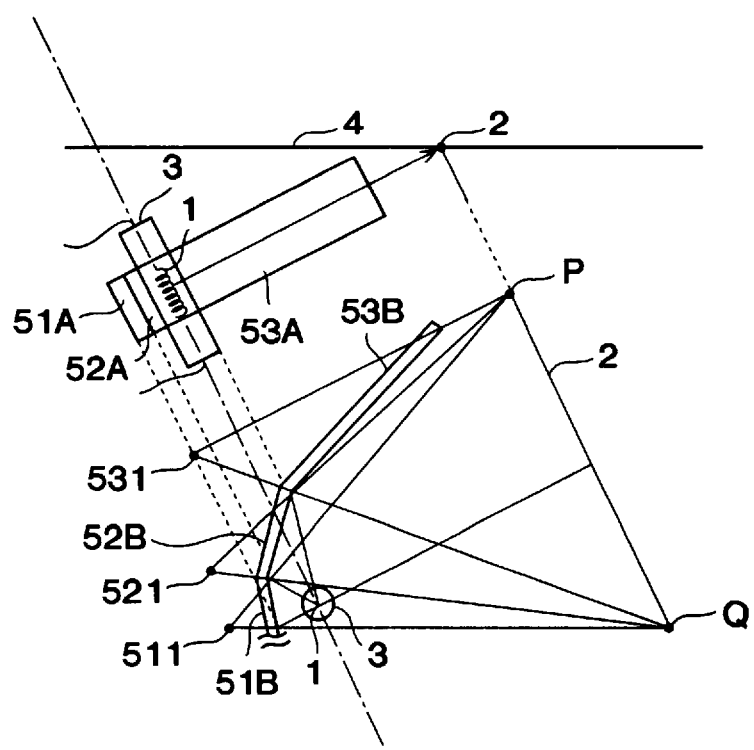
FIG. 4 is a side view and projection chart of a third embodiment of the present invention.
Figure 5:
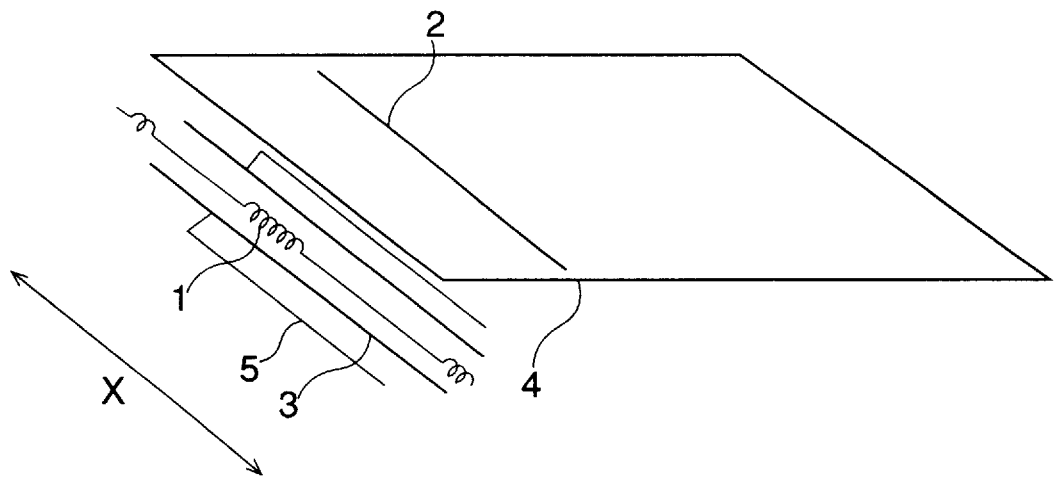
FIG. 5 is a view illustrating an example of the prior art.

A third embodiment of the present invention will now be described with reference to FIG. 4. In this embodiment, only the group of reflecting surfaces A (reflecting surfaces 51A, 52A, and 53A) is provided and the filament 1 is disposed so as to be perpendicular to the reading line 2 but not to be perpendicular to the original 4. In this case, all elements can secure positional accuracy loosely rotative to the axial direction of the filament and therefore, there is realized an illuminating device which is loose in assemblage tolerance and excellent in assembly property. Also, the group of reflecting surfaces A is not limited to a plane mirror, but may be a cylindrical mirror of non-power with respect to the axial direction of the filament.

As in the above-described embodiments, the light source having the spirally wound filament is disposed so that the axial direction of the filament may be perpendicular to the reading line on the original, and the group of reflecting surfaces A comprised of reflecting surfaces having a direction which is of non-power with respect to at least one direction is disposed so that said direction may be parallel to the axial direction of the filament and the area formed by linking together the axial centers of the mirror images of the filament formed by the respective reflecting surfaces constituting the group of reflecting surfaces A and the end portions of the respective reflecting surfaces in a direction orthogonal to said direction of non-power may include all the width of the reading line, whereby there can be provided a device for illuminating an original which is low in the cost of a power source and excellent in assembly property as well as high in efficiency and small and stable in the variation in illuminance distribution shape even for the floating of the original.

Also, the device for illuminating an original has the group of reflecting surfaces B comprised of reflecting surfaces 51B, 52B, and 53B having a direction which is of non-power with respect to at least one direction, and the group of reflecting surfaces B is disposed so that said direction may be parallel to the direction of the reading line and the mirror images of the reading line formed by the group of reflecting surfaces B may be included in the aforedescribed area, whereby there can be provided a device for illuminating an original which is higher in efficiency and more stable.

Further, the group of reflecting surfaces A is disposed plane-symmetrically with respect to a plane containing the center of the width of the reading line and the center of the axis of the filament, whereby the illuminance distribution on the reading line can be made bisymmetrical, and even for the floating of the original, the shape of the illuminance distribution can be prevented from being distorted into a non-bisymmetrical shape to thereby cause irregularity.

Also, provision is made of a single filament and groups of reflecting surfaces and therefore, there can be provided an illuminating device which is low in electric power consumption and low in the cost of the power source as well as low in heat generation.

Further, the axial direction of the filament and the direction of non-power of the group of reflecting surfaces A are made parallel to each other, whereby there can be provided an illuminating device of high performance which is uniform in illuminance distribution and hardly causes the deterioration of the quality of image even for the floating or the like of the original.

Also, there exists one and the same direction of non-power constituting the groups of reflecting surfaces and therefore, there can be provided an illuminating device which is higher in efficiency and yet easy in mechanical positioning as well as excellent in assembly property.

Since the direction of non-power is loose in the accuracy of positioning, it does not mechanically interfere against the positioning with respect to a direction which requires accuracy and therefore, a holding mechanism becomes easy and adjustment in assembly becomes unnecessary. If the length of the filament is great, the illuminance distribution in the divisional scanning direction will become broad and become strong even for the floating of the original.

The present invention is not restricted to the above-described embodiments, but covers any modification of the same technical idea.

What is claimed is:

1. A device for illuminating an original for use in an original reading apparatus for reading an original placed on an original supporting table having:
   a light source having a filament having its lengthwise direction disposed so as to be perpendicular to a reading line.

2. A device for illuminating an original according to claim 1, wherein a spiral portion of said filament is disposed so as to be perpendicular to the reading line.

3. A device for illuminating an original according to claim 1, further having a plurality of reflecting surfaces around said light source, all of said reflecting surfaces being disposed so as to independently reflect light from said light source to a whole area of the reading line of a predetermined length.

4. A device for illuminating an original according to claim 3, wherein said plurality of reflecting surfaces are disposed so that all virtual images of the reading line of said predetermined length may be included in an area surrounded by the virtual image of said light source corresponding to one of said reflecting surfaces and two straight lines passing through opposite ends of said one reflecting surface.

5. A device for illuminating an original according to claim 3, wherein said plurality of reflecting surfaces are flat surfaces.

6. A device for illuminating an original according to claim 3, wherein said plurality of reflecting surfaces are curved surfaces.

* * * * *

UNITED STATES PATENT AND TRADEMARK OFFICE
CERTIFICATE OF CORRECTION

PATENT NO. : 5,875,377

DATED : February 23, 1999

INVENTOR(S): MOTOMU FUKASAWA

It is certified that error appears in the above-identified patent and that said Letters Patent is hereby corrected as shown below:

```
On the title page, item

[30] Foreign Application Priority Data, insert
-- April 28, 1995 Japan 7-129016--.

COLUMN 1,
Line 41, "lengthwisely" should read --lengthwise--; and
Line 42, "Shading" should read --shading--.

COLUMN 2,
Line 14,  "and 52A," should read--and 52A,--.
```

Signed and Sealed this

Twenty-sixth Day of October, 1999

Attest:

Q. TODD DICKINSON

*Attesting Officer*     *Acting Commissioner of Patents and Trademarks*